E. W. WERDEN.
CULTIVATOR.
APPLICATION FILED JULY 23, 1908.
928,723.
Patented July 20, 1909.
2 SHEETS—SHEET 1.
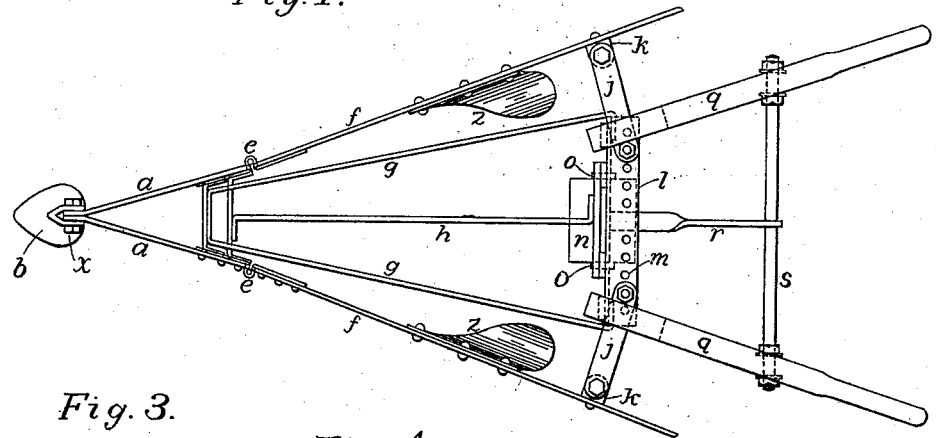
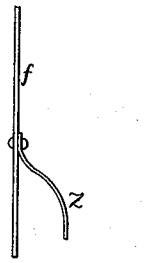
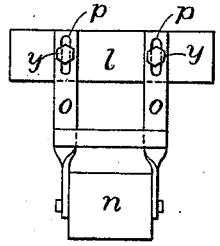
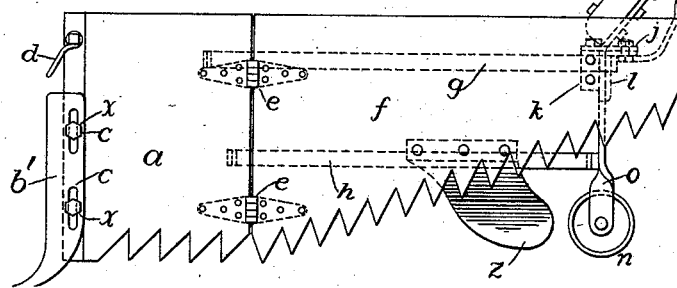
WITNESSES:
David J. Halsh
INVENTOR
Edward Whipple Werden
BY
ATTORNEY E. W. WERDEN.
CULTIVATOR.
APPLICATION FILED JULY 23, 1908.
928,723.
Patented July 20, 1909.
2 SHEETS—SHEET 2.
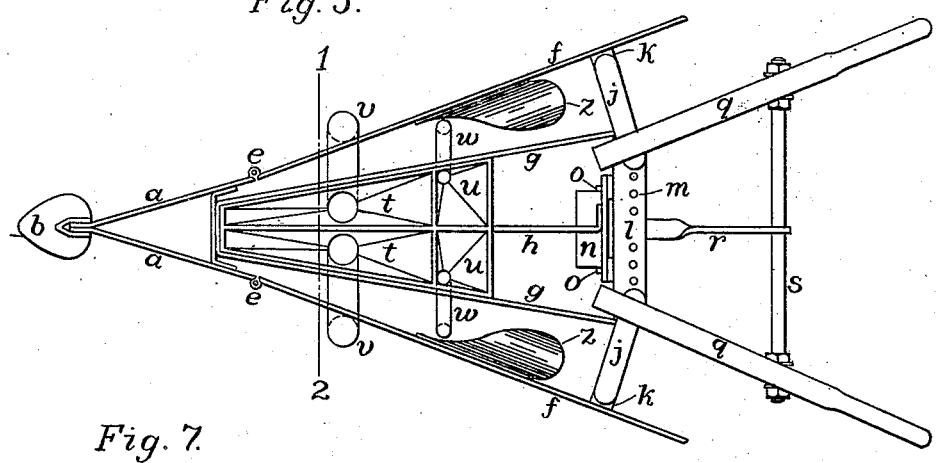
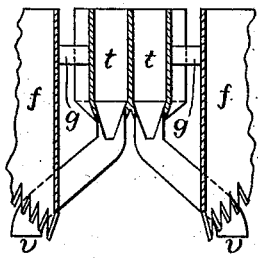
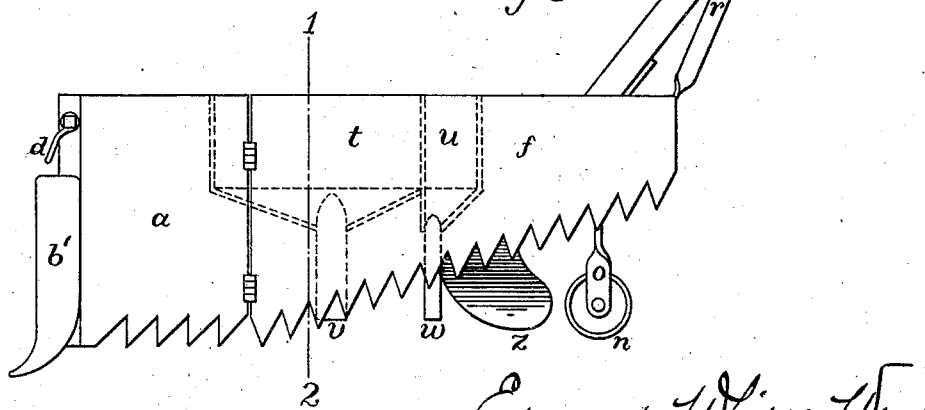

UNITED STATES PATENT OFFICE.

EDWARD WHIPPLE WERDEN, OF MOUNT VERNON, NEW YORK.

CULTIVATOR.

No. 928,723.  Specification of Letters Patent.  Patented July 20, 1909.

Application filed July 23, 1908. Serial No. 444,906.

*To all whom it may concern:*

Be it known that I, EDWARD WHIPPLE WERDEN, citizen of the United States, and resident of Mount Vernon, in the county of Westchester and State of New York, have invented a certain new and useful Improved Cultivator, of which the following is a specification.

This invention relates to that class of cultivators in which a plow is used with laterally adjustable wings, and has for its object to provide an improved cultivator of this character by means of which the device may be effectively operated to plow the earth, and to tear up and destroy weeds and roots.

The invention consists in an improved cultivator of this character constructed and arranged as hereinafter set forth and claimed.

Referring to the accompanying drawings in which similar letters of reference indicate like parts, Figure 1, is a plan view of the invention with seed and fertilizer hoppers omitted. Fig. 2 is a side view thereof. Fig. 3 is a detail view of one of the laterally adjustable wings looking at the rear end thereof. Fig. 4 is a detail view of a roller and a portion of the frame from which it is suspended. Fig. 5 is a plan view of the invention including seed and fertilizer hoppers. Fig. 6 is a side view of the device shown in Fig. 5, and Fig. 7 is a vertical cross section on the line 1—2 Fig. 5.

The cultivator is constructed with a V-shaped prow which serves as a plow, formed of metal plates $a$, $a$, preferably of steel secured together in any suitable manner, as for example by U-shaped cross bars or plates $a'$ bolted to the plates $a$, $a$, at their rear end and by bolts $x$, at their forward end.

The nose of the plow is provided with a vertically adjustable V-shaped cutter $b'$ having its lower end rounded and curved forward, the cutter $b'$ being adjustably mounted on the nose of the plow by means of slots $c$, $c$, in the cutter through which project the clamping bolts $x$. The object of the cutter $b'$ is to enable the plow to cut into the earth at any desired depth. The nose of the plow is provided with a hitching ring $b$. Hinged at the rear end of the V-shaped prow or plow by means of hinges $e$, are laterally adjustable wings $f$, one on each side, the wings being metal plates, preferably steel, extending rearwardly and outwardly at an angle. The lower edge of each plate $f$ is inclined upward from its hinged end to its rear end. The lower edge of each of the plates $a$ is preferably formed with vertically depending teeth $e'$, and the lower edge of each of the plates $f$ is preferably formed with teeth $f'$. By means of the teeth $e'$ and $f'$ and the inclined edge of the plates $f$, the plow and its wings may readily and effectively cut into the ground and through weeds and roots. Each of the plates $f$ is provided on its inner side and at its lower end with a plate $z$ projecting inwardly and rearwardly and serving as a mold-board to throw the earth over the seed where it has been dropped. The cultivator is provided with a frame consisting of the angle irons $g$, secured at their forward end to the cross bar $a'$ and at the rear end to a cross bar $l$.

The frame is braced by a bar $h$ secured at its forward end to one of the cross bars $a'$ and at its rear end to a cross bar or plate $o'$ secured to the plate $l$. In order that the wings $f$ may be adjusted laterally and held apart in adjusted position according to the width of furrows desired to be made, each wing $f$ is provided with a strap or bar $j$ adjustably connected at its inner end to the bar $l$ by a bolt and nut $l'$ adapted to engage one of the holes in the bar $l$. The cultivator is guided by means of handles $q$ secured to the frame and braced by a cross-bar or rod $s$ and the bar $r$ connected at its ends to the rods $s$, and the bar $l$.

In order to regulate the depth into which the teeth shall enter the ground a roller $n$ is provided, being mounted on straps or bars $o$ connected by a cross bar $n'$ and adjustably suspended from plate $l$ by means of bolts $y$ passing through slots $p$ in the straps $o$ and connected to plate $l$. By this means the roller $n$ may be raised or lowered and held in adjusted position. Fertilizer and seed hoppers $t$, $t$, and $u$, $u$, are mounted in the framework of the cultivator as shown in Fig. 5, and are provided with discharge spouts $v$, $v$, and $w$, $w$.

By means of this invention the plow and its wings may be drawn through the earth in adjusted position and weeds and roots effectively cut and destroyed. The earth may also be worked close up to growing corn or other crops by means of the construction and arrangement of parts hereinbefore described.

Having described the invention I claim:—

1. In a cultivator of the character described, a V-shaped plow and laterally adjustable rearwardly extending wings hinged to said plow, each wing having an inwardly projecting rearwardly extending mold board.

2. In a cultivator of the character described, a V-shaped plow with vertically depending teeth on its lower edges, and rearwardly extending wings having vertically depending teeth on their lower edge.

3. A cultivator having a V-shaped plow with vertical depending teeth on its lower edges, a vertically adjustable cutter mounted on the nose of the plow with a forwardly projecting curved pointed lower end, rearwardly extending wings hinged to the plow with vertical teeth on their lower edge, and each having an inwardly projecting mold board, and means for adjusting the depth of cut of the teeth.

4. In a cultivator of the character described, a V-shaped plow, with vertical teeth on its lower edges, rearwardly extending adjustable wings hinged to said plow and having vertical teeth on their lower edge, and a vertically adjustable roller for regulating the depth of cut of the teeth.

Signed at New York city in the county of New York and State of New York this 29th day of June A. D. 1908.

EDWARD WHIPPLE WERDEN.

Witnesses:
 ADAM E. SCHATZ,
 HENRY C. KENNEDY.